(12) United States Patent
Epp et al.

(10) Patent No.: US 11,926,571 B2
(45) Date of Patent: Mar. 12, 2024

(54) ROTARY COMPOSTER WITH CONTROL SYSTEM AND METHOD OF COMPOSTING

(71) Applicant: TRI-FORM POLY, INC., Morris (CA)

(72) Inventors: Timothy Epp, Morris (CA); John Epp, Morris (CA); Byron Irwin, Morris (CA); Abram Klassen, Morris (CA); Brian Wilcox, Morris (CA)

(73) Assignee: TRI-FORM POLY, INC., Morris (CA)

( * ) Notice: Subject to any disclaimer, the term of this patent is extended or adjusted under 35 U.S.C. 154(b) by 95 days.

(21) Appl. No.: 16/961,559

(22) PCT Filed: Oct. 16, 2018

(86) PCT No.: PCT/CA2018/051300
§ 371 (c)(1),
(2) Date: Jul. 10, 2020

(87) PCT Pub. No.: WO2019/136544
PCT Pub. Date: Jul. 18, 2019

(65) Prior Publication Data
US 2021/0061728 A1   Mar. 4, 2021

Related U.S. Application Data

(60) Provisional application No. 62/616,186, filed on Jan. 11, 2018.

(51) Int. Cl.
*C05F 17/929*   (2020.01)
*B09B 3/00*   (2022.01)
(Continued)

(52) U.S. Cl.
CPC ............ *C05F 17/929* (2020.01); *B09B 3/00* (2013.01); *C05F 1/02* (2013.01); *C05F 17/979* (2020.01); *C05F 17/993* (2020.01)

(58) Field of Classification Search
CPC ........ C05F 17/929; C05F 1/02; C05F 17/979; C05F 17/993; C05F 17/971; B09B 3/00; Y02A 40/20; Y02P 20/145; Y02W 30/40
See application file for complete search history.

(56) References Cited

U.S. PATENT DOCUMENTS 6,001,641 A  *  12/1999  Posselius, Jr.  ........  C05F 17/964
435/286.7
2003/0040651 A1  2/2003  Wilson et al.
(Continued)

FOREIGN PATENT DOCUMENTS

CN   203429074 U   2/2014
CN   204237717 U   4/2015
(Continued)

*Primary Examiner* — Jennifer A Smith
(74) *Attorney, Agent, or Firm* — TAROLLI, SUNDHEIM, COVELL & TUMMINO L.L.P.

(57) ABSTRACT

A rotary composter includes a rotatable composting drum, a motor for rotating the drum, an aeration system for supplying air to the drum and an open-loop computerized controller for controlling one or both of the motor and the aeration system based on animal growth data. The rotary composter may also have a wireless nitrogen gas sensor for sensing an amount of nitrogen gas in the drum and a load cell for measuring a mass inside the drum to enable the controller to further control one or both of the motor and the aeration system based on signals from the nitrogen gas sensor and the load cell.

5 Claims, 7 Drawing Sheets

(51) Int. Cl.
*C05F 1/02* (2006.01)
*C05F 17/979* (2020.01)
*C05F 17/993* (2020.01)

(56) References Cited

U.S. PATENT DOCUMENTS

2012/0196357 A1* 8/2012 Smith-Sebasto ...... C05F 17/979
                                                    435/290.3
2016/0347676 A1   12/2016 Sim et al.

FOREIGN PATENT DOCUMENTS

| CS | 273967 B1 | * | 11/1991 |
| JP | 2003275728 A | * | 9/2003 |
| WO | WO-2017130084 A1 | * | 8/2017 |

* cited by examiner

ROTARY COMPOSTER WITH CONTROL SYSTEM AND METHOD OF COMPOSTING

RELATED APPLICATIONS

The present invention is a U.S. National Stage under 35 USC 371 patent application, claiming priority to Serial No. PCT/CA2018/051300, filed on 16 Oct. 2018; which claims priority of 62/616,186, filed on 11 Jan. 2018, the entirety of both of which are incorporated herein by reference.

TECHNICAL FIELD

The present invention relates generally to composting and more specifically to a rotary composter and a method of composting using a rotary composter.

BACKGROUND

Composting is a biological process carried out under controlled aerobic (oxygen) conditions in which various micro-organisms including bacteria and fungi break down organic matter into simpler substances.

Animal mortality composting, or carcass composting, is a technique to compost to dead animals such as poultry, turkey, hogs or other livestock that have perished prematurely on the farm.

A rotary composter is an apparatus for in-vessel composting in which organic materials are fed into a rotatable drum, cylinder or vessel in which the environmental conditions (e.g. temperature, moisture and aeration) are controlled. A rotary composter may have a motor to automatically rotate the drum. The rotary composter may also have an air intake through which air is drawn to accelerate the composting process.

It is known to regulate the rate of rotation of the drum and the amount of air entering the drum by monitoring the temperature inside the drum as well as the levels of carbon dioxide and ammonia within the drum. Despite these advancements in the art, further improvements to the technology of rotary composters remain highly desirable in order to further increase the efficiency of the composting process.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

Disclosed in this specification is a novel and inventive rotary composter having a control system. In one main embodiment, the control system is an open-loop control system that uses animal growth data to control the rates of aeration and rotation of the composter. In another embodiment, the control system is a closed-loop control system that measures nitrogen gas concentration and a mass of the carcasses loaded into the composter to control the rates of aeration and rotation of the composter.

Accordingly, one inventive aspect of the present disclosure is a rotary composter comprising a rotatable composting drum, a motor for rotating the drum, an aeration system for supplying air to the drum and an open-loop computerized controller for controlling one or both of the motor and the aeration system based on animal growth data.

The rotary composter may optionally include a drive roller having a drum-locating boss.

The rotary composter may optionally include a movable gantry.

Another inventive aspect of the present disclosure is a rotary composter comprising a rotatable composting drum, a motor for rotating the drum, an aeration system for supplying air to the drum, a wireless nitrogen gas sensor for sensing an amount of nitrogen gas in the drum, a load cell for measuring a mass inside the drum and a closed-loop computerized controller for controlling one or both of the motor and the aeration system based on signals from the nitrogen gas sensor and the load cell.

As noted above, this rotary composter may include a drive roller having a drum-locating boss and/or a movable gantry.

A further inventive aspect of the present disclosure is a method of composting using a rotary composter. The method entails steps, acts or operations of inserting animal carcasses into a composting drum of the rotary composter, storing animal growth data in a memory of a computerized controller, rotating the composting drum using a motor, supplying air to the drum using an aeration system, and controlling one or both of the motor and the aeration system using the computerized controller based on the animal growth data stored in the memory. The method may further entail steps, acts or operations of measuring a concentration of nitrogen gas inside the drum, measuring a mass of the carcasses within the drum, and then further controlling one or both of the motor and the aeration system using the computerized controller based on the concentration of nitrogen gas and the mass of the carcasses within the drum.

Yet a further inventive aspect of the present disclosure is a method of composting using a rotary composter. The method entails inserting animal carcasses into a composting drum of the rotary composter, rotating the composting drum using a motor, supplying air to the drum using an aeration system, measuring a concentration of nitrogen gas inside the drum, measuring a mass of the carcasses within the drum, and controlling one or both of the motor and the aeration system using the computerized controller based on the concentration of nitrogen gas and the mass of the carcasses within the drum. The step of measuring the concentration of nitrogen gas may be accomplished using a wireless sensor configured to wirelessly transmit a signal representing the concentration of nitrogen gas to the controller.

Other inventive aspects may become apparent from the specification and drawings.

BRIEF DESCRIPTION OF THE DRAWINGS

Further features and advantages of the present invention will become apparent from the following detailed description, taken in combination with the appended drawings in which.

It will be noted that throughout the appended drawings, like features are identified by like reference numerals.

DETAILED DESCRIPTION

In general, the specification discloses a novel and inventive rotary composter that uses a control system to regulate the rates of rotation and aeration. As will be described below in greater detail, the control system may be an open-loop control system or a closed-loop control system or a combination of both. In the first main embodiment, the open-loop control system control the rates of rotation and aeration of the rotary composter based on animal growth data. In the second main embodiment, the closed-loop control system controls the rates of rotation and aeration by receiving signals from a sensor that measures a concentration of nitrogen gas inside the rotary composter and also from a load cell that measures a mass of the animal carcasses within the rotary composter.

These embodiments are now described in further detail with respect to the figures.

Figure 1:
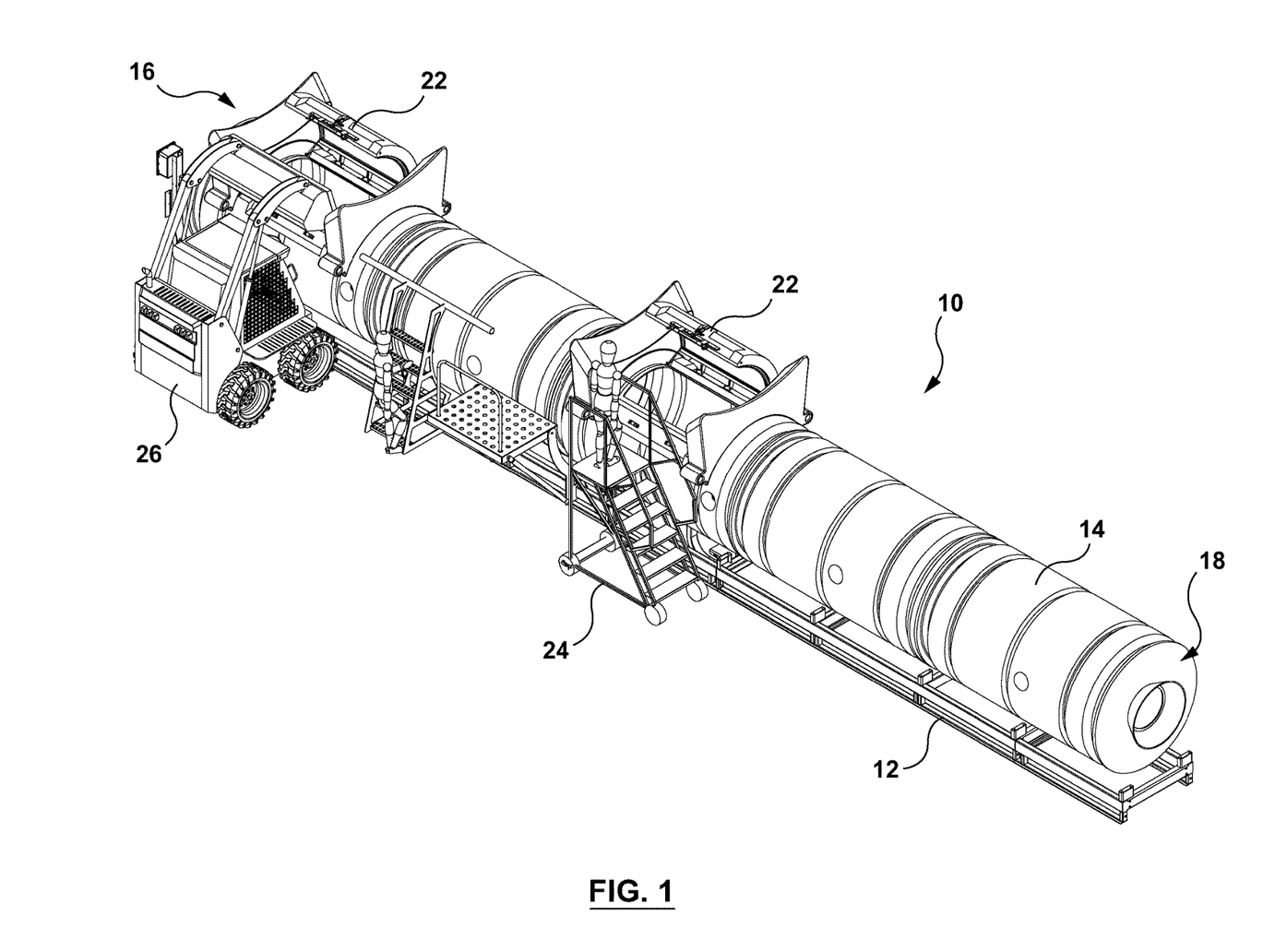
FIG. 1 is a perspective view of a rotary composter in accordance with embodiments of the present invention.
Figure 2:
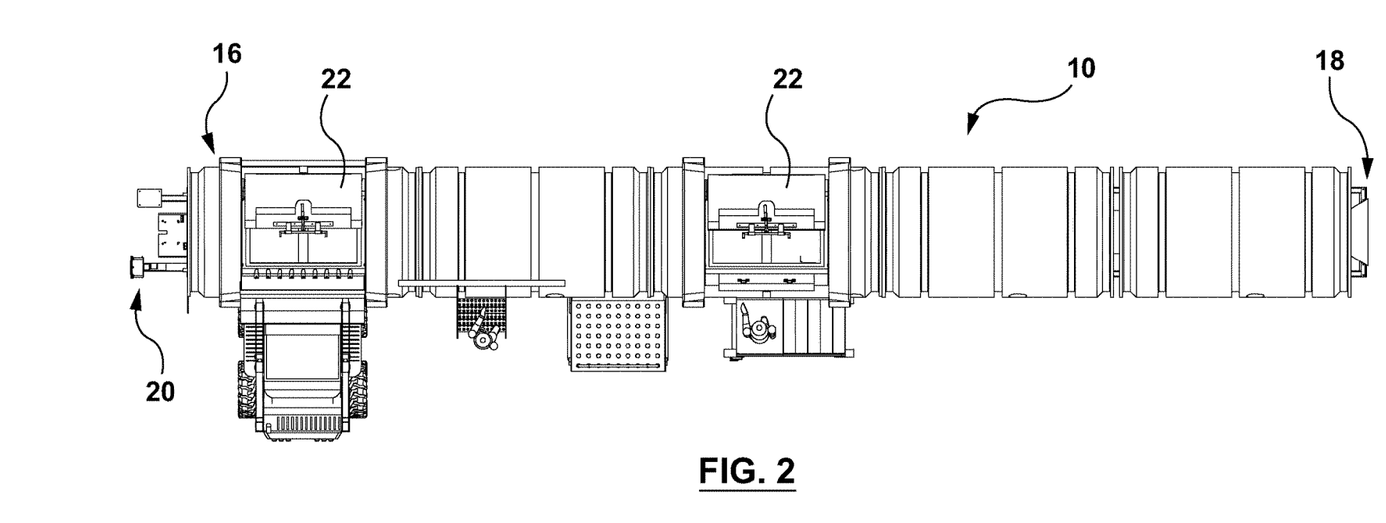
FIG. 2 is a top view of the rotary composter of FIG. 1.
Figure 3:
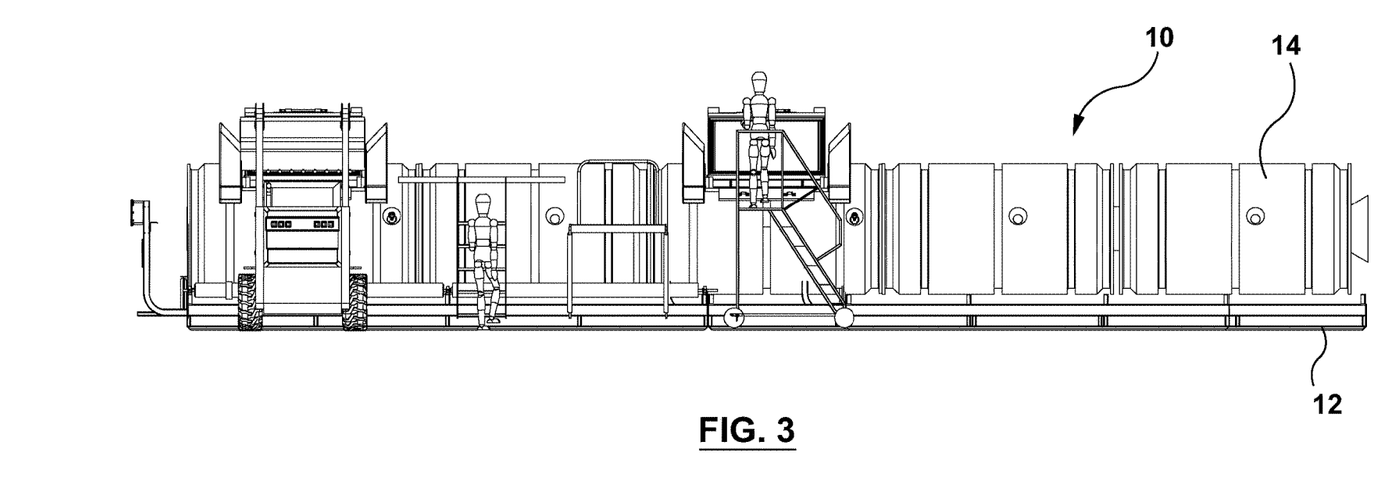
FIG. 3 is a side view of the rotary composter of FIG. 1.
Figure 4:
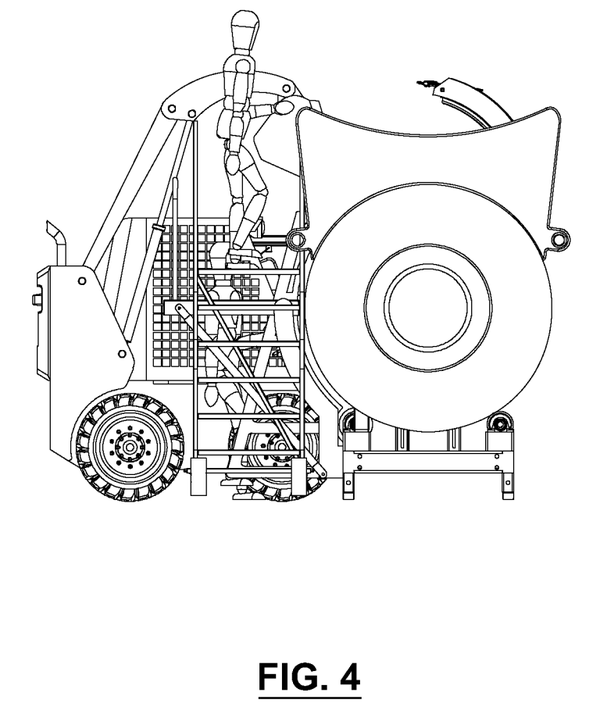
FIG. 4 is an end view of the rotary composter of FIG. 1.

FIG. 1 is a perspective view of a rotary composter in accordance with embodiments of the present invention. FIGS. 2, 3 and 4 are top, side and end views of the rotary composter of FIG. 1. The rotary composter, which is designated by reference numeral 10, has a frame 12 and a generally cylindrically shaped drum or vessel 14 that is rotationally supported above the frame. The drum 14 defines an interior space that is designed to contain the organic matter (i.e. animal mortalities or carcasses) to be composted. As is known in the art, a carbon-based material such as sawdust, wood chips or straw is added to the organic matter. The drum has a first end 16 and a second end 18. At the first end is a drive system 20 that includes a motor and a controller.

As depicted in FIGS. 1-4, the rotary composter 10 has one or more top hatches 22 into which the animal carcasses and carbon-based material may be inserted into the drum. The rotatable drum is rotationally supported on a frame. The drum is rotated by the motor of the drive system. The motor which may be any suitable powerplant e.g. an electric motor, gas engine, diesel engine, hydraulic motor, etc. The motor may be connected to the drum by a gearbox or other transmission. The rotary composter also includes an aeration system which includes a fan or blower and an air intake. The aeration system supplies air to the drum. The aeration system also includes an outlet or valve for releasing gas from the drum that is generated by the composting process.

Optionally, as illustrated in FIGS. 1-4, the rotary composter may include a movable gantry 24 to enable loading of the drum. Alternatively, a skid-steer loading vehicle 26 may be used as also shown.

Figure 5:
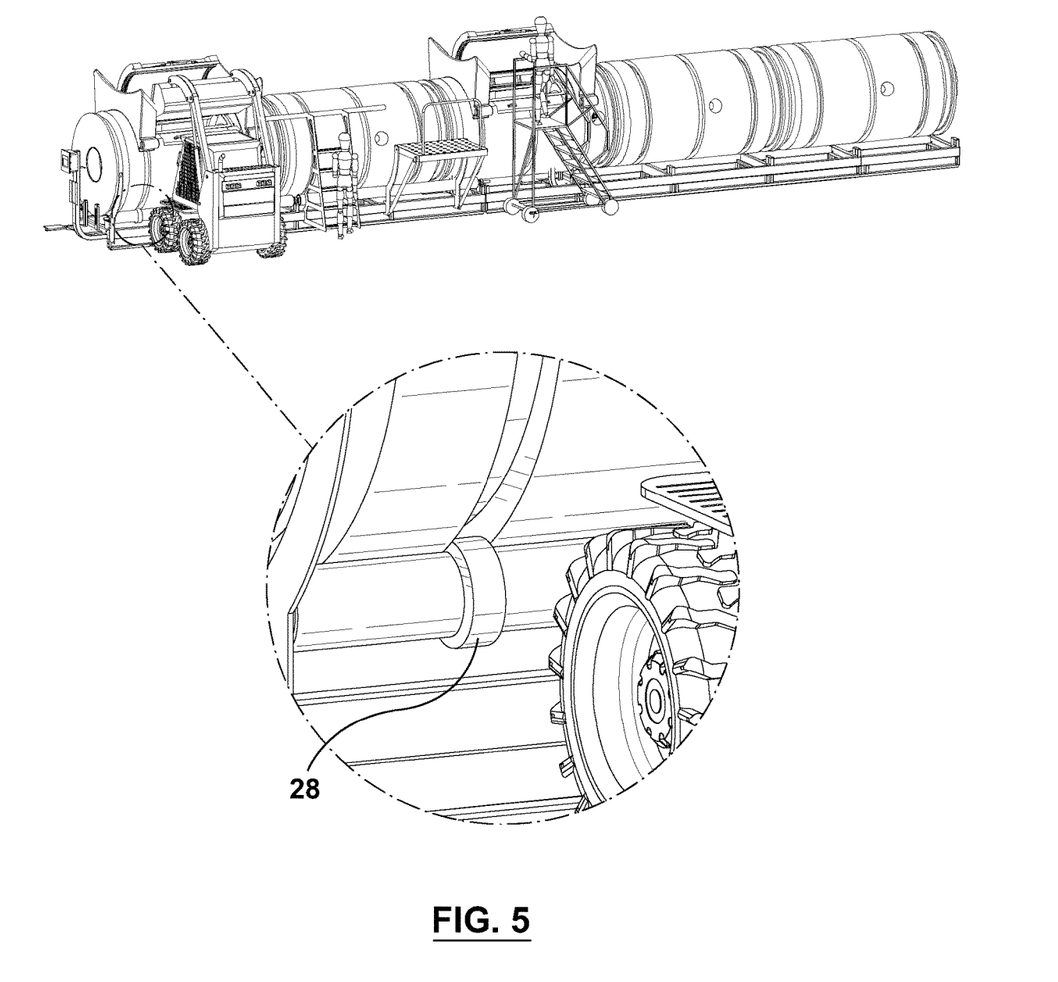
FIG. 5 is an enlarged view of a drum-locating boss that may be part of a drum roller of a rotary composter of FIG. 1.

Optionally, as illustrated in FIG. 5, the rotary composter may include a drum-locating boss 28 that may be part of a drum roller to provide structural support and to ensure proper rotational alignment of the drum.

Figure 6:
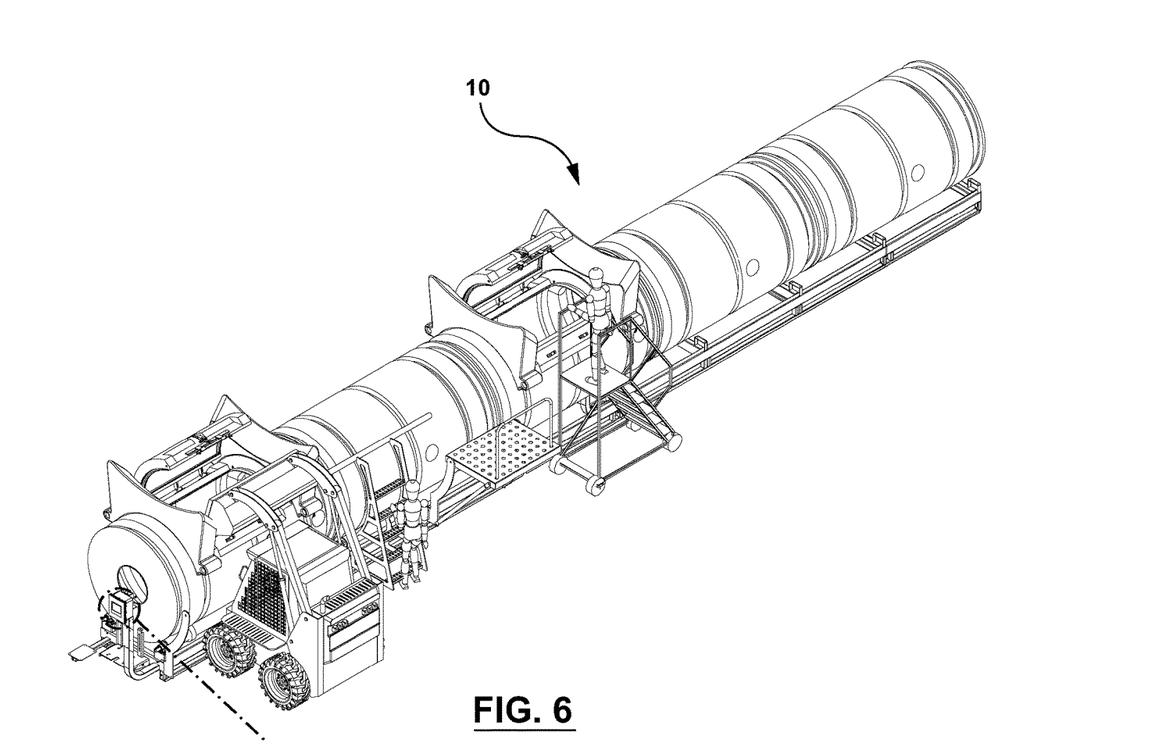
FIG. 6 is another perspective view of the rotary composter of FIG. 1.
Figure 7:
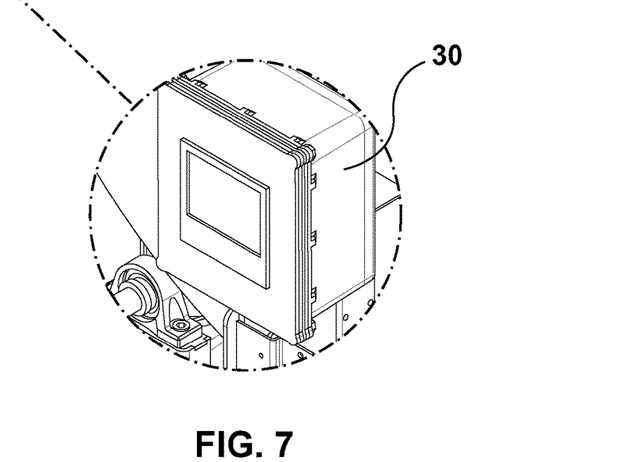
FIG. 7 is an enlarged view of an open-loop controller for the rotary composter in accordance with a first main embodiment of the present invention.
Figure 8:
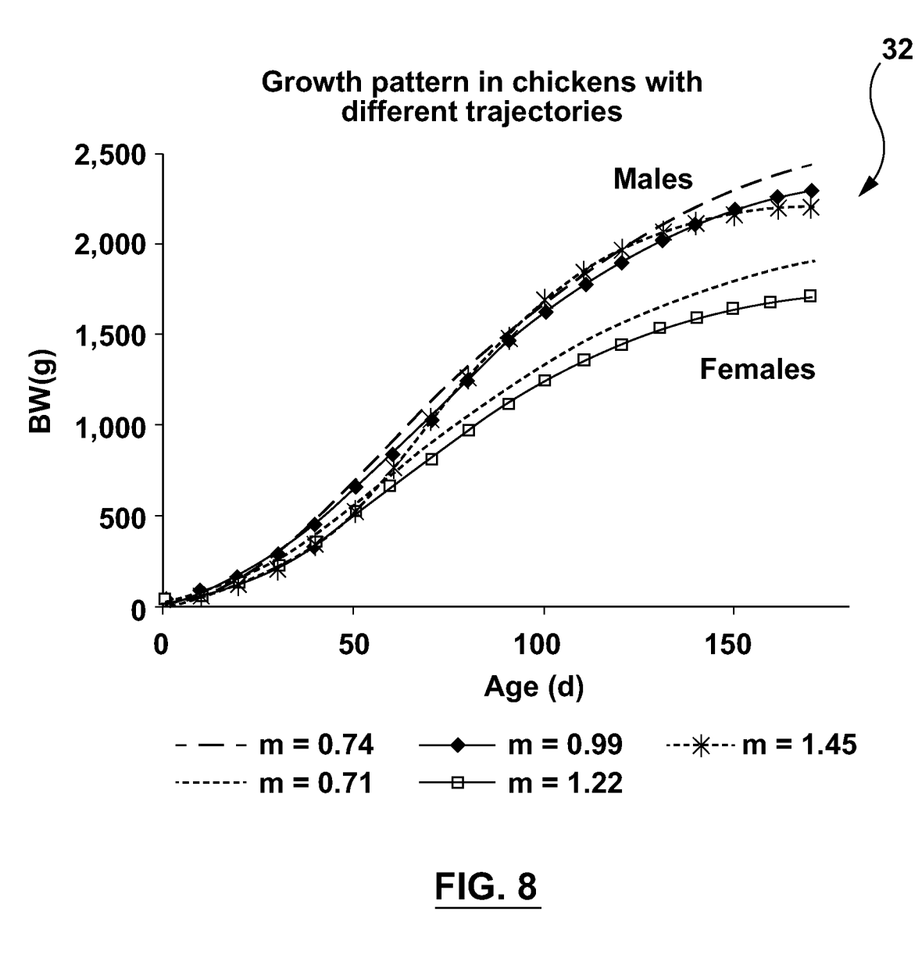
FIG. 8 is a graph of animal growth patterns for an open loop control system for a rotary composter in accordance with a first embodiment of the present invention.

In the first main embodiment, as shown in FIGS. 6-7, the rotary composter 10 has an open-loop computerized controller (or control system) 30 for controlling one or both of the motor and the aeration system based on animal growth data. Animal growth data is information about the size and/or condition of the animal at the time of death. The animal growth data may be provided in any suitable manner to the controller, e.g. manually input or entered by the user, or copied, communicated or transferred by wireless or wired data connection. The animal growth data provides the controller with a starting point for determining appropriate rates of rotation and aeration for efficient composting. The animal growth data may include the types of animals, the ages of the animal mortalities, their weights, their gender/sex, cause of death, and other any other useful or pertinent information about the animals to be composted. In one example, the controller is programmed with data relating to animal growth patterns such as the ones shown by way of example only in the animal growth graph 32 of FIG. 8.

Figure 9:
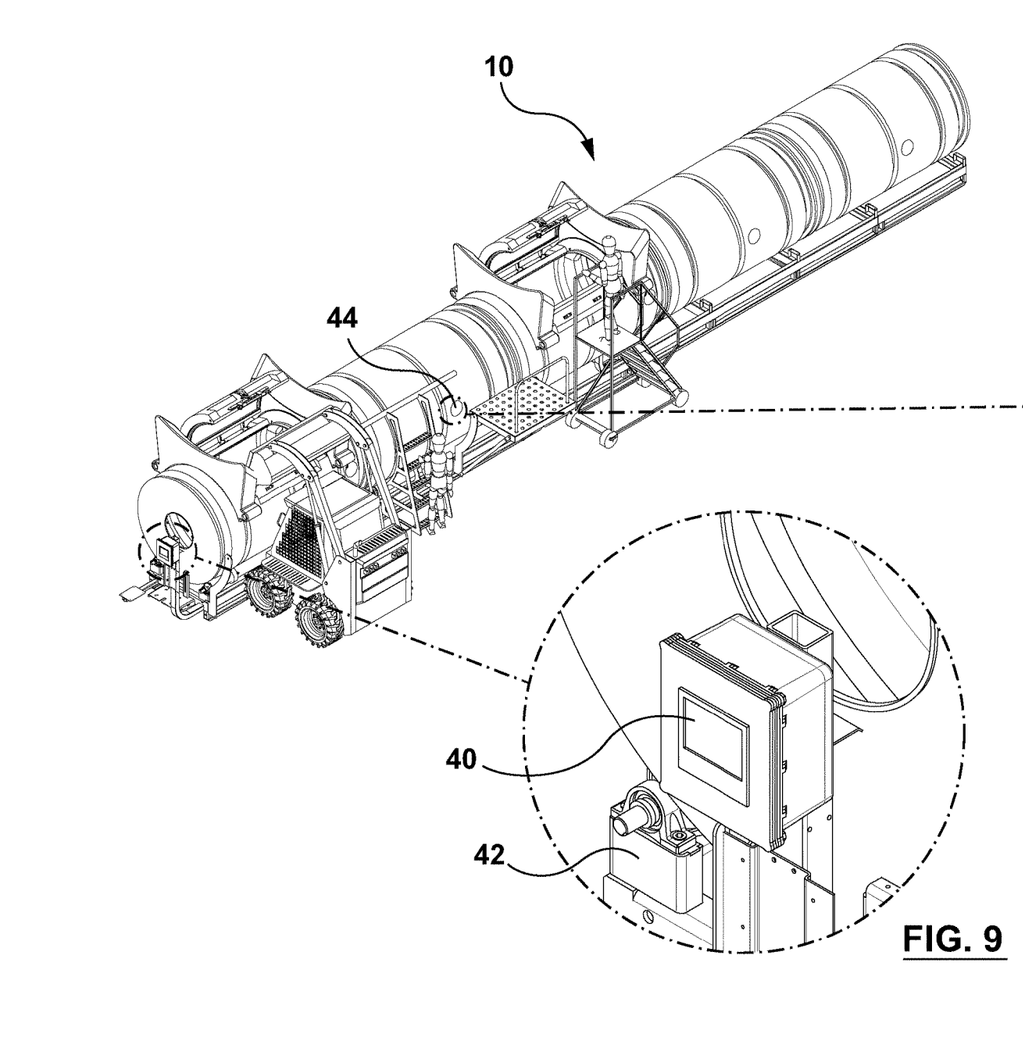
FIG. 9 is an enlarged view of a computerized controller and a load cell for a closed loop control system for a rotary composter in accordance with a second main embodiment of the present invention.

FIG. 9 is an enlarged view of a computerized controller 40 and a load cell 42 for a closed loop control system for a rotary composter 10 in accordance with a second main embodiment of the present invention. The load cell measures the mass of animal mortality within the drum.

Figure 10:
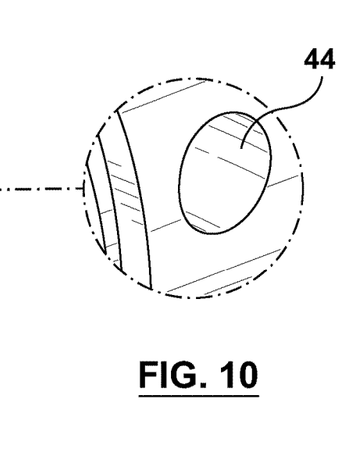
FIG. 10 is an enlarged view of a wireless nitrogen gas sensor for a closed loop control system for a rotary composter as a variant of the second main embodiment.

FIG. 10 is an enlarged view of a wireless nitrogen gas sensor 44 that may be added to the drum of the rotary composter to provide a signal representative of the concentration of nitrogen gas for the closed loop control system of FIG. 9.

In this closed-loop control system, the controller adjust the rates of rotation and aeration based on one or both of the mass and the nitrogen concentration.

In a further (third) main embodiment, the open-loop and closed-loop control systems can be combined. In this embodiment, the animal growth data is used by the controller to initiate the composting, providing initial settings for rotation and aeration. Once underway, the nitrogen and mass measurements are used to further control the composting process by adjusting the rates of rotation and aeration.

The method or methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc.

The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), or any other circuit, chip or equivalent controller.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A rotary composter comprising:
   a rotatable composting drum;
   a motor connected to a gearbox connected to an end of the drum for rotating the drum;
   a drive roller having a drum-locating boss for both rotational alignment of the drum and structural support, wherein the drum-locating boss has an annular shape that fits inside an annular groove in the drum;
   an aeration system for supplying air to the drum;
   a nitrogen gas sensor for sensing an amount of nitrogen gas in the drum;
   a load cell for measuring a mass of carcasses inside the drum; and
   a combined open-loop and closed-loop computerized controller for controlling both of the motor and the aeration system, the controller being configured to initiate composting based on animal growth data, wherein the animal growth data comprises any one or more of animal type, age, gender, and cause of death, wherein the controller is further configured, after a period time, to control composting by adjusting rates of rotation and aeration based on the concentration of nitrogen gas and the mass of the carcasses within the drum.

2. The rotary corn poster of claim 1 further comprising a movable gantry.

3. The rotary composter of claim 1 further comprising:
   a plurality of top hatches that are configured to pivot open about an axis parallel to an angle of rotation of the drum.

4. The rotary composter of claim 1, wherein the drum-locating boss extends radially from a shaft disposed beneath the drum.

5. A method of composting using a rotary composter, the method comprising:
   inserting animal carcasses into a composting drum of the rotary composter;
   storing animal growth data in a memory of a computerized controller;
   rotating the composting drum using a motor connected via a gearbox to an end of the drum;
   rotationally aligning and structurally supporting the drum using a drum-locating boss, wherein the drum-locating boss has an annular shape that fits inside an annular groove in the drum;
   supplying air to the drum using an aeration system;
   initially controlling one or both of the motor and the aeration system using the computerized controller based on the animal growth data stored in the memory, wherein the animal growth data comprises any one or more of animal type, age, gender, and cause of death; and
   measuring a concentration of nitrogen gas inside the drum using nitrogen gas sensors;
   measuring, using a load cell, a mass of the carcasses within the drum; and
   further controlling one or both of the motor and the aeration system using the computerized controller based on the concentration of nitrogen gas and the mass of the carcasses within the drum.

* * * * *